United States Patent
Floyd et al.

(10) Patent No.: US 8,402,750 B2
(45) Date of Patent: Mar. 26, 2013

(54) REAGENT TANK NORMALIZING SYSTEM

(75) Inventors: Ryan A. Floyd, Mason, MI (US); Eric Grant, Ypsilanti, MI (US); Dan McAninch, Jackson, MI (US); David Blumhardt, Jackson, MI (US); John M. Lowry, Brooklyn, MI (US); Michael L. Shovels, Aurora, IL (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 31 days.

(21) Appl. No.: 13/274,408

(22) Filed: Oct. 17, 2011

(65) Prior Publication Data
US 2012/0141331 A1 Jun. 7, 2012

Related U.S. Application Data

(60) Provisional application No. 61/420,422, filed on Dec. 7, 2010.

(51) Int. Cl.
*F01N 3/00* (2006.01)
(52) U.S. Cl. .......................................... 60/286; 60/295
(58) Field of Classification Search ................. 60/286, 60/296; 222/146.2, 146.6, 318
See application file for complete search history.

(56) References Cited

U.S. PATENT DOCUMENTS

| 6,203,770 | B1 | 3/2001 | Peter-Hoblyn et al. | |
| 6,810,661 | B2* | 11/2004 | Lambert et al. | 60/286 |
| 2004/0025498 | A1 | 2/2004 | Lambert et al. | |
| 2004/0098978 | A1 | 5/2004 | Tarabulski et al. | |
| 2007/0266703 | A1* | 11/2007 | Hirata et al. | 60/299 |
| 2009/0100824 | A1* | 4/2009 | Starck et al. | 60/286 |
| 2009/0179087 | A1 | 7/2009 | Martin et al. | |
| 2009/0183778 | A1* | 7/2009 | Wildegger | 137/13 |
| 2010/0077740 | A1* | 4/2010 | Basista et al. | 60/310 |
| 2010/0095653 | A1* | 4/2010 | Thiagarajan et al. | 60/286 |
| 2010/0205948 | A1* | 8/2010 | Bauer et al. | 60/303 |

FOREIGN PATENT DOCUMENTS
WO  WO 00/21881  4/2000

* cited by examiner

*Primary Examiner* — Thomas Denion
*Assistant Examiner* — Jason Shanske
(74) *Attorney, Agent, or Firm* — Harness, Dickey & Pierce, P.L.C.

(57) ABSTRACT

A reagent injection system for reducing emissions from an engine includes a reagent container. A heating element is positioned in a heat transfer relationship with reagent stored within the container. An interchange tube includes a first end in receipt of a recirculated liquid reagent and a second open end positioned in the container. The interchange tube includes a bleed-off tube branching off of the interchange tube between the first and second ends. A terminal end of the bleed-off tube is positioned within a vapor dome above a surface of the reagent.

18 Claims, 1 Drawing Sheet

REAGENT TANK NORMALIZING SYSTEM

CROSS-REFERENCE TO RELATED APPLICATIONS

This application claims the benefit of U.S. Provisional Application No. 61/420,422, filed on Dec. 7, 2010. The entire disclosure of the above application is incorporated herein by reference.

FIELD

The present disclosure relates to exhaust gas treatment systems and, more particularly, to an injector system for injecting a reagent into an exhaust stream from an engine.

BACKGROUND

This section provides background information related to the present disclosure which is not necessarily prior art.

Internal combustion engines may output undesirable pollution emissions, specifically in the form of oxides of nitrogen (NOx). One method used to reduce NOx emissions from internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust NOx mass flow. The reagent/exhaust gas mixture is passed through a reactor containing a catalyst, such as, for example, activated carbon, or metals, such as platinum, vanadium or tungsten, which are capable of reducing the NOx concentration in the presence of the reagent.

A diesel emissions fluid such as an aqueous urea solution is known to be an effective reagent in SCR systems for diesel engines. Use of such an aqueous urea solution, however, and other reagents may include disadvantages. Aqueous urea has a freezing point of approximately −11° C. In some climates, the aqueous urea will freeze to a solid state. One or more heaters may need to be employed to assure proper operation of the exhaust treatment system.

In at least one known arrangement, a flange style heating unit is positioned within the reagent tank. A central volume or core of liquid reagent is obtained by thawing the frozen reagent. During some modes of operation, the liquid reagent may be completely consumed and pumped from the tank prior to melting the remaining frozen reagent. Pump cavitation may occur. Pump damage may result. Furthermore, reagent will not be pumped into the exhaust stream and the vehicle may fail emissions testing. Pumping of the liquid reagent from a cavity adjacent the heating element may form a substantial vacuum within the vacated cavity. Damage to the pump or other exhaust treatment system components may result. As such, it may be advantageous to provide an improved reagent injection system to address these concerns.

SUMMARY

This section provides a general summary of the disclosure, and is not a comprehensive disclosure of its full scope or all of its features.

A reagent injection system for reducing emissions from an engine includes a reagent container. A heating element is positioned in a heat transfer relationship with reagent stored within the container. An interchange tube includes a first end in receipt of a recirculated liquid reagent and a second open end positioned in the container. The interchange tube includes a bleed-off tube branching off of the interchange tube between the first and second ends. A terminal end of the bleed-off tube is positioned within a vapor dome above a surface of the reagent.

A reagent injection system for reducing emissions from an engine includes an injector, a reagent container, and a pump for pumping liquid reagent from the container. A supply line connects the pump and the injector. A return line is provided for recirculating reagent from the injector to the container. A heating element is positioned in a heat transfer relationship with reagent stored within the container. An interchange tube includes a first end in communication with the return line for receipt of the recirculated liquid reagent. A second open end of the interchange tube is positioned in the container. The interchange tube includes a bleed-off tube branching off of the interchange tube between first and second ends. A terminal end of the bleed-off tube is positioned within a vapor dome above a surface of the reagent.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of NOx emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Patent Application Publication No. 2009/0179087A1, filed Nov. 21, 2008, entitled "Method And Apparatus For Injecting Atomized Fluids," which is incorporated herein by reference.

Figure 1:
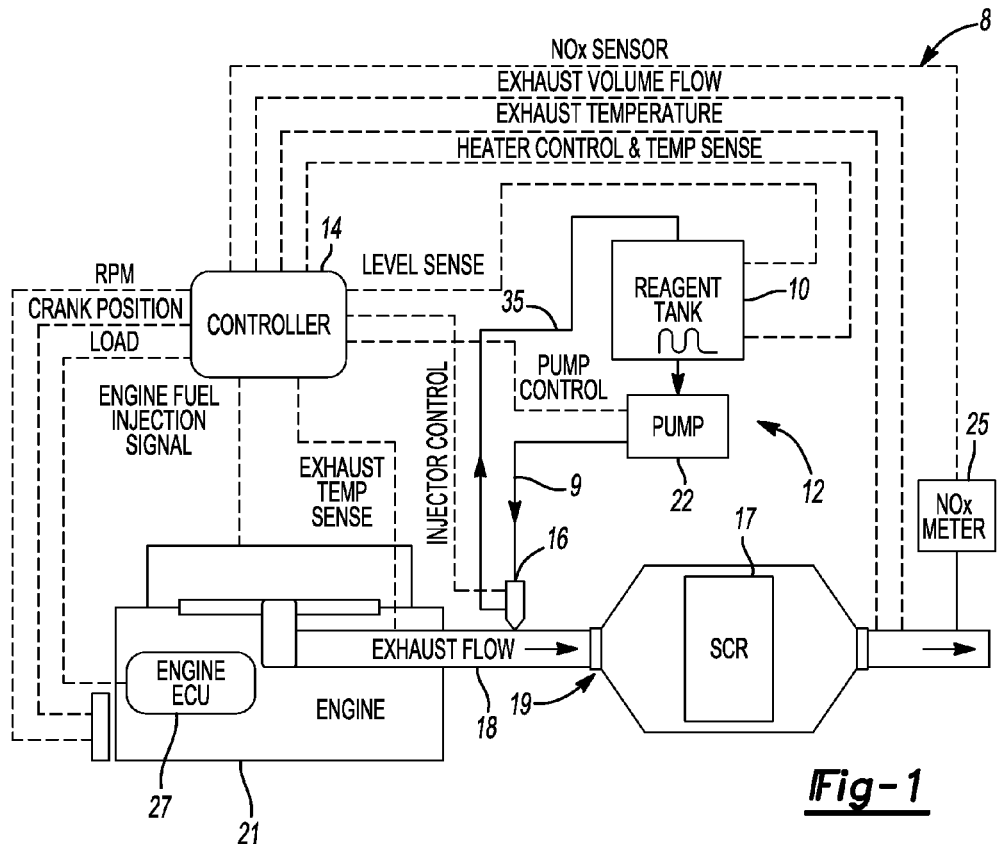
FIG. 1 shows a schematic diagram of an exemplary internal combustion engine with an exhaust treatment system including a reagent tank normalizing system.

With reference to the Figures, an exhaust treatment system 8 for reducing NOx emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 19. Exhaust system 19 includes an exhaust conduit 18 providing an exhaust stream to at least one catalyst bed 17.

The delivery module 12 may include a pump 22 that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at a predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16.

The amount of reagent required may vary with load, engine RPM, engine speed, exhaust gas temperature, exhaust gas flow, engine fuel injection timing, desired NOx reduction, barometric pressure, relative humidity, EGR rate and engine coolant temperature. A NOx sensor or meter 25 is positioned downstream from catalyst bed 17. NOx sensor 25 is operable to output a signal indicative of the exhaust NOx content to injection controller 14. All or some of the engine operating parameters may be supplied from an engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Exhaust system 8 also incorporates various freeze protection strategies to thaw frozen reagent or to prevent the reagent from freezing. For example, supply line 9 and return line 35 may be heated to assure that reagent does not freeze within the lines. It is contemplated that the lines may be heated using electrically powered sheathing that surround and extend along the length of supply line 9 and return line 35.

Figure 2:
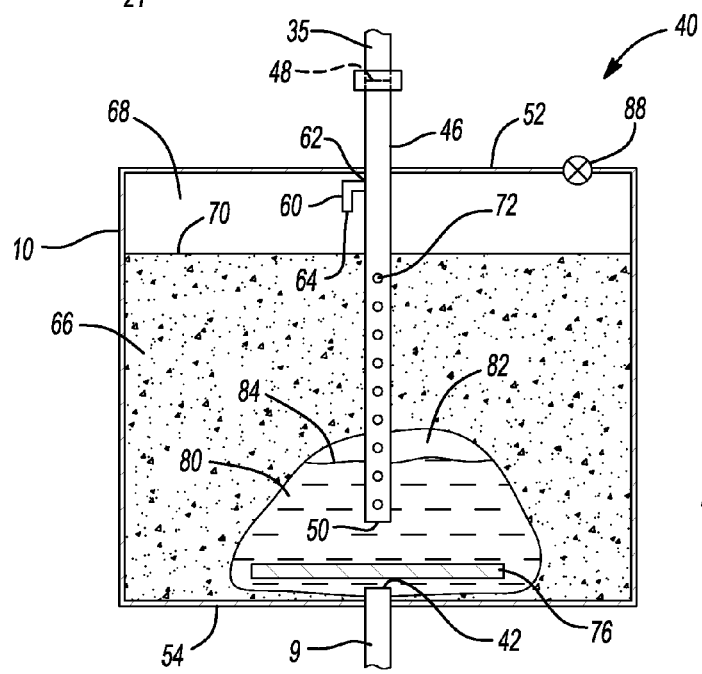
FIG. 2 is a schematic diagram of the reagent tank normalizing system.

FIG. 2 depicts another freeze protection subsystem identified at reference numeral 40. More particularly, subsystem 40 may be referred to as a reagent tank normalizing system. Normalizing system 40 functions to assure that a volume of liquid reagent remains in communication with an inlet 42 of supply line 9. As long as a supply of liquid reagent remains in communication with inlet 42, pump 22 may properly operate without cavitation. If the liquid reagent were to be pumped from tank 10 prior to the remaining frozen reagent being melted, inlet 42 may be in communication with an air pocket. Pump 22 may cavitate and reagent may not be injected into the exhaust as desired.

Normalizing system 40 includes an interchange tube 46 including a first end 48 in fluid communication with return line 35 and a second free end 50 being positioned within tank 10. Interchange tube 46 is substantially vertically oriented in relation to the ground and extends through an upper surface 52 of tank 10 a distance greater than half way into the tank. Second end 50 is offset from a lower or bottom surface 54 of tank 10. Interchange tube 46 also includes a bleed-off tube 60 having a first end 62 in communication with an inner volume of interchange tube 46 and a second open end 64. Interchange tube 46 includes a plurality of transversely extending apertures 72 axially spaced apart from one another. Apertures 72 allow fluid communication between volumes inside and outside interchange tube 46.

In cold weather operation, the reagent may freeze to a solid state. Frozen reagent is depicted at reference numeral 66 of FIG. 2. A first vapor dome 68 is formed above an upper surface 70 of reagent 66. When the reagent tank 10 is "filled," first vapor dome 68 comprises approximately eleven percent of the volume of tank 10. First vapor dome 68 accommodates the increase in reagent volume when liquid reagent freezes as a solid. Furthermore, bleed-off tube 60 is positioned within first vapor dome 68, above the reagent level, to assure that bleed-off tube 60 will not be blocked by frozen reagent.

A heating element 76 is positioned in a heat transfer relationship with the reagent contained in tank 10. Heating element 76 may be positioned within tank 10 proximate bottom surface 54, as shown in FIG. 2. Alternatively, heating element 76 may be combined with pump 22 to define delivery module 12. The delivery module may be spaced apart from or integrally formed with tank 10.

Electrical energy may be provided to heating element 76 to melt the frozen reagent. As energy is transferred to the reagent, a volume 80 of liquid reagent forms adjacent to heating element 76. Pump 22 may draw liquid reagent 80 through inlet 42 and provide pressurized reagent to supply line 9 and injector 16. During typical operation, only one to two percent of the pumped reagent is injected into the exhaust stream via injector 16. The remaining approximate ninety-eight percent of liquid reagent is recirculated via return line 35.

The temperature of the reagent may be slightly increased when travelling through injector 16 due to the energy content of the exhaust. The temperature of the reagent remains substantially constant thereafter because supply line 9 and return line 35 are heated as previously described. Pressurized reagent enters interchange tube first end 48 and begins to flow into tank 10. If a substantial quantity of frozen reagent 66 is present, the heated and pressurized liquid reagent flowing through return line 35 will travel through bleed-off tube 60 and exit second open end 64. Bleed-off tube 60 and second open end 64 are oriented to direct a stream of liquid reagent toward surface 70 proximate an outer surface of interchange tube 46. The flow of heated reagent will begin to melt frozen reagent 66. At the same time, heated and pressurized reagent acts on the frozen column of reagent within interchange tube 46. In a relatively short amount of time, a fluid communication path will be established between liquid reagent volume 80 and the liquid reagent returning via return line 35. As the column of frozen reagent inside interchange tube 46 melts, apertures 72 will be placed in fluid communication with liquid reagent supplied from return line 35. Liquid reagent will flow through apertures 72 and further expedite the melting of frozen reagent 66 adjacent an outside surface of interchange tube 46.

During the pumping operation, a second vapor dome 82 may be formed above a surface 84 of liquid reagent 80. Apertures 72 and bleed-off tube 60 allow communication between first vapor dome 68 and second vapor dome 82 to equalize the pressure therebetween. A pressure relief valve 88 allows communication between first vapor dome 68 and the atmosphere. As such, formation of a vacuum within second vapor dome 82 is avoided.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reagent injection system for reducing emissions from an engine, the system comprising:
   a reagent container;
   a heating element positioned in a heat transfer relationship with reagent stored within the container; and
   an interchange tube having a first end in receipt of a recirculated liquid reagent and a second open end positioned in the container, the interchange tube including a bleed-off tube branching off of the interchange tube between the first and second ends, wherein a terminal end of the bleed-off tube is positioned within a vapor dome above a surface of the reagent.

2. The system of claim 1, wherein the interchange tube includes a plurality of transversely extending apertures.

3. The system of claim 2, wherein the second end of the interchange tube is proximate the heating element.

4. The system of claim 3, wherein the terminal end of the bleed-off tube is positioned to direct a stream of recirculated liquid reagent toward a frozen portion of reagent.

5. The system of claim 4, wherein the interchange tube provides a plurality of passageways through the container to equalize the pressure between spaced apart zones in the container.

6. The system of claim 1, wherein the heating element is positioned proximate the bottom of the container.

7. The system of claim 1, further including a pump drawing liquid reagent through a supply line in fluid communication with the container.

8. The system of claim 7, further including a return line supplying the pumped and recirculated reagent that has not been injected into the engine exhaust to the first end of the interchange tube.

9. The system of claim 8, further including an injector positioned at the junction of the supply line and the return line, the injector injecting reagent into the engine exhaust.

10. The system of claim 7, wherein the supply line includes an inlet positioned proximate a bottom of the container.

11. The system of claim 10, wherein the heating element is positioned within the container between the second end of the interchange tube and the inlet.

12. A reagent injection system for reducing emissions from an engine, the system comprising:
    an injector;
    a reagent container;
    a pump for pumping liquid reagent from the container;
    a supply line connecting the pump and the injector;
    a return line for recirculating reagent from the injector to the container;
    a heating element positioned in a heat transfer relationship with reagent stored within the container; and
    an interchange tube having a first end in communication with the return line for receipt of the recirculated liquid reagent and a second open end positioned in the container, the interchange tube including a bleed-off tube branching off of the interchange tube between the first and second ends, wherein a terminal end of the bleed-off tube is positioned within a vapor dome above a surface of the reagent.

13. The system of claim 12, wherein the interchange tube includes a plurality of axially spaced apart and transversely extending apertures.

14. The system of claim 12, wherein the second end of the interchange tube is proximate the heating element.

15. The system of claim 12, wherein the terminal end of the bleed-off tube is positioned to direct a stream of recirculated liquid reagent toward an outer surface of the interchange tube.

16. The system of claim 12, wherein the interchange tube provides a plurality of passageways through the container to equalize the pressure between spaced apart zones in the container.

17. The system of claim 12, wherein the supply line includes an inlet positioned proximate a bottom of the container.

18. The system of claim 17, wherein the heating element is positioned within the container between the second end of the interchange tube and the inlet.

* * * * *